United States Patent
Studt et al.

(10) Patent No.: US 6,434,486 B1
(45) Date of Patent: Aug. 13, 2002

(54) TECHNIQUE FOR LIMITING THE RANGE OF AN OBJECT SENSING SYSTEM IN A VEHICLE

(75) Inventors: David Glen Studt, Noblesville; Mark Ford Henderson, Kokomo; Ronald Melvin Taylor, Greentown, all of IN (US)

(73) Assignee: Delphi Technologies Inc., Troy, MI (US)

( * ) Notice: Subject to any disclaimer, the term of this patent is extended or adjusted under 35 U.S.C. 154(b) by 0 days.

(21) Appl. No.: 09/648,972

(22) Filed: Aug. 28, 2000

(51) Int. Cl.$^7$ .............................................. G06F 165/00
(52) U.S. Cl. ........................ 701/301; 701/96; 180/169; 340/435
(58) Field of Search ................................. 701/300, 301, 701/96; 342/70, 71, 72; 340/435, 436, 438; 180/167–169, 204, 401, 404, 407

(56) References Cited

U.S. PATENT DOCUMENTS

| | | | |
|---|---|---|---|
| 5,350,912 A | * 9/1994 | Ishida | 250/202 |
| 5,457,632 A | * 10/1995 | Tagawa et al. | 701/43 |
| 5,479,173 A | * 12/1995 | Yoshioka et al. | 342/70 |
| 5,689,264 A | * 11/1997 | Ishikawa et al. | 342/70 |
| 5,872,507 A | * 2/1999 | Weber et al. | 340/435 |
| 6,081,188 A | * 6/2000 | Kutlucinar et al. | 340/438 |
| 6,170,591 B1 | * 1/2001 | Salai et al. | 180/204 |

* cited by examiner

Primary Examiner—William A. Cuchlinski, Jr.
Assistant Examiner—Marthe Y. Marc-Coleman
(74) Attorney, Agent, or Firm—Jimmy L. Funke (57) ABSTRACT

An object sensing system is capable of masking certain detected objects such that the system does not provide an alarm. Initially, a projected path of the vehicle is determined by using a current steering angle of the vehicle. Next, a desired warning distance is determined based upon the current steering angle. Then, a current distance to a sensed object, as derived from an object sensor, is determined. Finally, an alarm is provided only if the sensed object is within the desired warning distance.

40 Claims, 2 Drawing Sheets

TECHNIQUE FOR LIMITING THE RANGE OF AN OBJECT SENSING SYSTEM IN A VEHICLE

TECHNICAL FIELD

The present invention is directed to a technique for limiting the range of an object sensing system, and more specifically to ensuring that certain objects detected by the sensing system that are not in the vehicle path do not cause the sensing system to provide an alarm.

BACKGROUND OF THE INVENTION

Increasingly, vehicle manufactures are installing safety devices in vehicles to enable drivers to drive in a safer more efficient manner. For example, some manufactures have included forward looking systems (FLSs), rear detection systems (RDSs) and side detection systems (SDSs) within certain vehicle models. An adaptive cruise control (ACC) system is one example of a FLS.

A typical ACC system uses a radar sensor (some use laser sensors), mounted at the front of the vehicle, to detect objects in the forward path of the vehicle. If the lane ahead is clear, the ACC system maintains a set vehicle speed. However, when a slower vehicle is detected, the ACC system maintains a driver selected distance (using throttle control and limited braking) between the vehicles. A typical ACC system uses mechanically scanned radar sensors, which normally improves the ability of the system to detect targets (i.e., vehicles) in heavy traffic. A typical commercially available ACC system has a range of 150 meters, an azimuth of 15 degrees and updates at a 10 Hz rate. An ACC system generally determines a range of a detected object, as well as the relative speed of the detected object.

SDSs detect objects that are at a side of a vehicle (i.e., in a driver's blind spot). A typical SDS includes a radar sensor that is mounted in each rear quarter panel of the vehicle. Each radar sensor is designed to detect objects in an adjacent lane. In this manner, the SDS can provide a visual indication to the driver to warn of objects in the driver's blind spot.

An example of a RDS is a back-up aid (BUA) or a reverse sensing system. BUAs are typically used as short range parking aids and have included visual and audible alarms to warn a driver of an impending collision. A typical BUA system includes a radar sensor that provides a rear detection range of up to 6 meters. Some BUAs also include ultrasonic sensors that provide bumper coverage. A typical BUA is activated when a vehicle is put into a reverse gear and is useful for parallel parking, backing in and out of parking spaces and backing at higher speeds.

Due to the range of the sensors included within most BUAs, many objects at the rear of a vehicle cause the BUA to provide a warning of an impending contact even though an object is not within the path of the vehicle. As such, a technique that prevents certain objects that are not in the projected path of the vehicle from causing the BUA to provide an alarm is desirable.

SUMMARY OF THE INVENTION

The present invention is directed to an object sensing system that is capable of limiting its range so that certain detected objects, that are not in the path of the vehicle, do not cause the system to provide an alarm. Initially, a projected path of the vehicle is determined by using a current steering angle of the vehicle. Next, a desired warning distance is determined based upon the current steering angle. Then, a current distance to a sensed object, as derived from an object sensor, is determined. Finally, an alarm is provided only if the sensed object is within the desired warning distance.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENT

Due to the sensor range of many back-up aids (BUAs), there are frequently objects (e.g., bicycles, tricycles, another vehicle, etc.) at a rear of a vehicle, within the range of the sensors of the BUA, that are not in the path of the vehicle. These objects can cause the BUA to provide a nuisance alarm. To prevent certain objects from providing nuisance alarms, the effective range of the BUA is limited, based on a radius of curvature of the vehicle, to exclude many objects that are not in the path of the vehicle. This increases the value of the BUA to the customer as many nuisance alarms can be avoided. The radius of curvature of the vehicle can be determined by, for example, steering angle sensors or yaw rate sensors. However, typical yaw rate sensors (e.g., angular accelerometers) generally do not function appropriately at lower reversing speeds. As is well understood by one of ordinary skill in the art, a steering angle sensor is typically positioned on a steering column of a vehicle so as to provide an indicator of the current steering angle. A number of suitable steering angle sensors are commercially available. A yaw rate sensor, when utilized, can be positioned virtually anywhere within the vehicle, as desired. A number of suitable yaw rate sensors are also commercially available.

Figure 1:
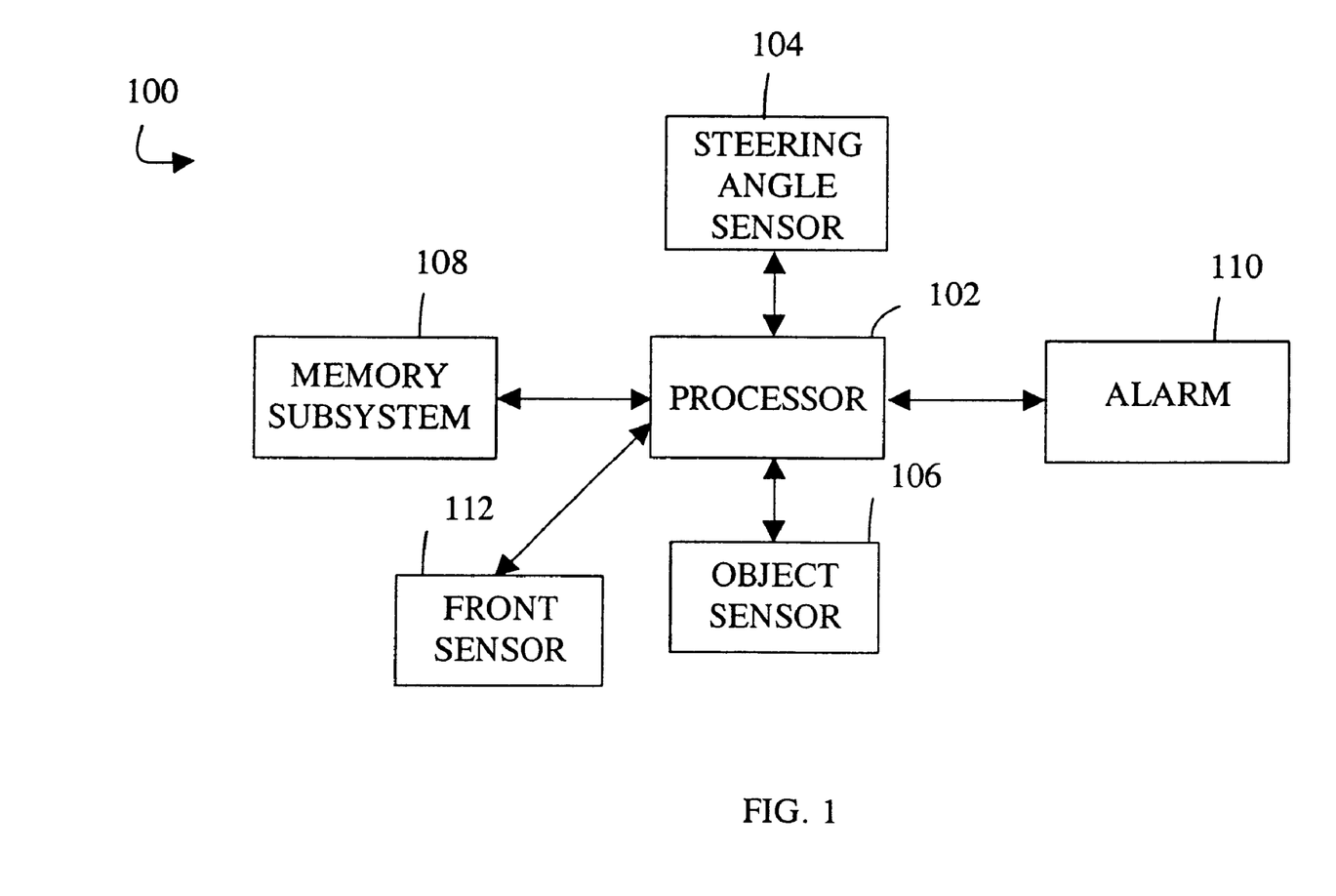
FIG. 1 is an electrical block diagram of an object sensing system according to an embodiment of the present invention.

FIG. 1 illustrates a block diagram of an object sensing system 100, according to an embodiment of the present invention. The object sensing system 100 includes a processor 102 coupled to a memory subsystem 108, a steering angle sensor 104, an object sensor 106, an alarm 110 and a front sensor 112. Memory subsystem 108 includes an application appropriate amount of volatile memory (e.g., dynamic random access memory (DRAM)) and/or non-volatile memory (e.g., flash memory, electrically erasable programmable read only memory (EEPROM)). In a preferred embodiment, processor executable code, for limiting the range of object sensing system 100, is stored within the non-volatile memory of memory subsystem 108. Processor 102 provides control signals to steering angle sensor 104 and receives data from steering angle sensor 104 in response to the control signals. Front sensor 112 receives control signals from processor 102 and in response to the control signals, provides data to processor 102. Processor 102 also provides control signals to object sensor 106 and receives data from object sensor 106 in response to the control signals.

In one embodiment, object sensor 106 of sensing system 100 includes a radar sensor that is mounted at the rear of a vehicle. In another embodiment, object sensor 106 includes a radar sensor and two ultrasonic sensors that are mounted at the rear of a vehicle. In yet another embodiment, system 100 includes an object sensor 106 (that includes a radar sensor and a pair of ultrasonic sensors) and a front sensor 112 (that includes a pair of ultrasonic or radar sensors). In a preferred embodiment, the maximum range of the radar sensor is about 6 meters (i.e., about 20 feet). Preferably, the radar sensor has a resolution of about 10 cm. A suitable radar sensor is manufactured and made commercially available by Delphi Delco (Part No. 10002893). Preferably, the output from the radar sensor to the processor 102, is divided into thirty 20 cm windows. Each window includes either a digital '0' or a digital '1', depending upon whether a reflection was received by the radar sensor during a time period that corresponds to a particular window. In this manner, processor 102 can determine the distance to a sensed object. For example, a digital "1" in the twenty-third window would indicate an object at 4.6 meters.

A number of suitable ultrasonic sensors are commercially available. The ultrasonic sensors, provide bumper coverage, and are coupled to processor 102, which controls when the sensors send out an impulse of sound. A receiver in the ultrasonic sensor listens for an echo above a set threshold and takes a signal line to the microcontroller high when such a signal is sensed. The processor 102 can determine the distance to a given object by examining the time at which a signal was transmitted and the time at which a reflected signal was received.

In the preferred embodiment, object sensing system 100 provides both qualitative audible and visual warnings to a driver of the vehicle. Referring to FIG. 1, alarm 110 can represent a visual indicator, an audible indicator, or both. For example, a plurality of light emitting diodes (LEDs) can be included within alarm 110. An exemplary visual indicator includes six LEDs that indicate the distance to an object—when all six of the LEDs are lit, the object is at the closest point to the rear of the vehicle. An exemplary audible indicator provides an audible output between two and ten Hz. For example, an object at ten foot causes system 100 to provide an audible tone at a frequency of two Hz. An object at one and one-half foot causes system 100 to provide a continuous audible tone. At intermediate distances, an audible tone is provided at a frequency between two Hz and ten Hz.

Figure 2:
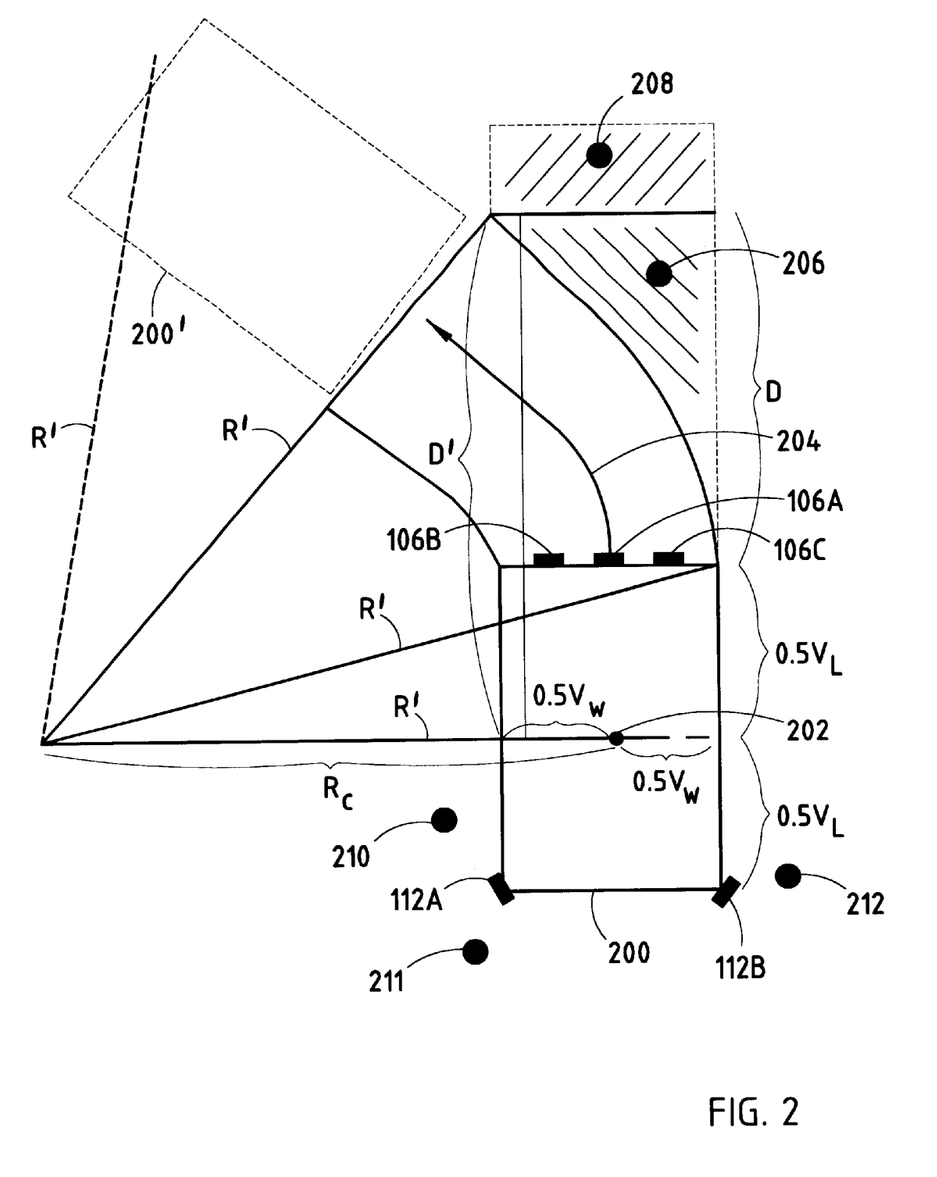
FIG. 2 is a diagram illustrating a projected path of a vehicle and a desired warning distance, according to an embodiment of the present invention.

FIG. 2 provides an illustration of how objects at a rear of the vehicle 200, that includes object sensing system 100, are filtered. A radius of curvature ($R_C$) is based on a center 202 of vehicle 200. The center 202 of vehicle 200 is used as a reference point to develop the equations discussed below. One of ordinary skill in the art will appreciate that other reference points could be utilized. The width of the vehicle ($V_W$) and the length of the vehicle ($V_L$) are illustrated in FIG. 2. A desired warning distance (D) varies depending upon the path of vehicle 200. If the actual distance to a given object is greater than (D), then an alarm, if provided, is a nuisance alarm. In the diagram of FIG. 2, a first object 206, while not within the projected path 204 of vehicle 200, will still cause system 100 to provide an alarm (e.g., audible and/or visual) because object 206 is within the desired warning distance (D). However, a second object 208 that is outside of the desired warning distance (D), but within the sensing range of system 100, will not cause system 100 to provide an alarm. This is because object 208 is outside the desired warning distance (D). Vehicle 200' represents vehicle 200 at a particular point in time after travelling along projected path 204. An outer radius (R') of projected path 204 is equal to the radius of curvature ($R_C$) plus one-half of the vehicle width (0.5*$V_W$). The equations for determining R', D' and D are set forth below.

$$R' = \sqrt{\left(R_C + \frac{V_W}{2}\right)^2 + \left(\frac{V_L}{2}\right)^2}$$

$$D' = \sqrt{R'^2 - \left(R_C - \frac{V_W}{2}\right)^2}$$

$$D = D' - \frac{V_L}{2}$$

$$D = \sqrt{2R_C V_W + \frac{V_L^2}{4}} - \frac{V_L}{2}$$

Using the above equations, a desired warning distance (D) can be determined. For example, a 6 feet wide, 18 feet long vehicle with a radius of curvature ($R_C$) of 20 feet, has a desired warning range of approximately 8.9 feet. For a system with a detection range of 20 feet, the outer 11.1 feet of detection range will yield nuisance alarms. As shown in FIG. 2, object 208 would provide a nuisance alarm in prior art systems. As will be readily understood by one of ordinary skill in the art, many objects that would provide nuisance alarms are eliminated by an object sensing system incorporating the present invention. However, other objects which are within the desired warning distance (D) (e.g., object 206), even though they are not in the projected path 204 of vehicle 200, will still provide an alarm.

A system 100, as described herein, can also benefit from the use of front sensors 112A and 112B. A pair of front sensors 112A and 112B can be utilized in reverse to warn a driver if a side (e.g., front quarter panel) of a vehicle will impact an object. In a system utilizing front sensors 112A and 112B, the steering angle sensor 104 (or yaw rate sensor) can also be utilized such that objects opposite the side the vehicle is turning to are ignored. For example, object 210 located on the left side of vehicle 200, will not cause system 100 to provide an alarm. Since sensors 112A and 112B are mounted, so as to provide both front and side coverage objects, such as object 211 can also be ignored when vehicle 200 is moving as shown in FIG. 2. However, object 212 would cause system 100 to provide an alarm. In systems that include yaw rate sensors for suspension control, adaptive cruise control and navigation systems, the invention as described herein can be added with little additional cost. One of ordinary skill in the art, upon reading the description provided herein, will appreciate that other algorithms can be utilized to estimate the vehicle path such that objects not in the vehicle path are ignored. As such, the description of the algorithm provided herein is not intended to be limiting.

In summary, the present invention limits the range of an object sensing system in that certain objects detected by the sensing system, that are not in the vehicle path (i.e., those outside of a desired warning distance), do not cause the sensing system to provide an alarm to a driver of the vehicle. The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A method for limiting the range of an object sensing system such that certain objects detected by the sensing system that are not in a vehicle path do not cause the sensing system to provide an alarm, comprising the steps of:
   determining a projected path of a vehicle based upon a current steering angle of the vehicle;
   determining a desired warning distance based upon the current steering angle;
   determining a current distance to a sensed object; and
   providing an alarm only if the sensed object is within the desired warning distance.

2. The method of claim 1, wherein the desired warning distance is a function of a width, a length and a radius of curvature of the vehicle, wherein the radius of curvature is derived from the current steering angle.

3. The method of claim 1, wherein the sensing system includes a radar sensor mounted at a rear of the vehicle.

4. The method of claim 1, wherein the sensing system includes a radar sensor and two ultrasonic sensors mounted at a rear of the vehicle.

5. The method of claim 1, wherein the maximum range of the sensing system is limited to about twenty feet.

6. The method of claim 1, wherein the current steering angle is provided by a steering angle sensor.

7. The method of claim 1, wherein the current steering angle is provided by a yaw rate sensor.

8. An object sensing system that provides for limiting the range of the sensing system such that certain objects detected by the sensing system that are not in a vehicle path do not cause the sensing system to provide an alarm, comprising:
   a processor;
   a memory subsystem for storing information coupled to the processor;
   a steering angle sensor coupled to the processor;
   an object sensor coupled to the processor; and
   processor executable code for causing the processor to perform the steps of:
      determining a projected path of a vehicle using a current steering angle of the vehicle as derived from the steering angle sensor;
      determining a desired warning distance based upon the current steering angle;
      determining a current distance to a sensed object as derived from the object sensor; and
      providing an alarm only if the sensed object is within the desired warning distance.

9. The system of claim 8, wherein the desired warning distance is of function of a width, a length and a radius of curvature of the vehicle, wherein the radius of curvature is derived from the current steering angle.

10. The system of claim 8, wherein the object sensor includes a radar sensor mounted at a rear of the vehicle.

11. The system of claim 8, wherein the object sensor includes a radar sensor and two ultrasonic sensors mounted at a rear of the vehicle.

12. The system of claim 8, wherein the maximum range of the object sensor is limited to about twenty feet.

13. The system of claim 8, wherein the current steering angle is provided by a steering angle sensor.

14. The system of claim 8, wherein the current steering angle is provided by a yaw rate sensor.

15. An object sensing system that provides for limiting the range of the sensing system such that certain objects detected by the sensing system that are not in a vehicle path do not cause the sensing system to provide an alarm, comprising:
   a processor;
   a memory subsystem for storing information coupled to the processor;
   a steering angle sensor coupled to the processor;
   an object sensor coupled to the processor, wherein the object sensor includes a radar sensor that is mounted at a rear of a vehicle; and
   processor executable code for causing the processor to perform the steps of:
      determining a projected path of the vehicle using a current steering angle of the vehicle as derived from the steering angle sensor;
      determining a desired warning distance based upon the current steering angle;
      determining a current distance to a sensed object as derived from the object sensor; and
      providing an alarm only if the sensed object is within the desired warning distance.

16. The system of claim 15, wherein the desired warning distance is a function of a width, a length and a radius of curvature of the vehicle, wherein the radius of curvature is derived from the current steering angle.

17. The system of claim 15, wherein the object sensor further includes two ultrasonic sensors mounted at a rear of the vehicle.

18. The system of claim 15, wherein the current steering angle is provided by a steering angle sensor.

19. The system of claim 15, wherein the current steering angle is provided by a yaw rate sensor.

20. The system of claim 15, wherein the maximum range of the object sensor is limited to about twenty feet.

21. A method for limiting the range of a object sensing system such that certain objects detected by the sensing system that are not in a vehicle path do not cause the sensing system to provide an alarm, comprising the steps of:
   determining a desired warning distance based upon the current steering angle;
   determining a current distance to a sensed object; and
   providing an alarm only if the sensed object is within the desired warning distance.

22. The method of claim 21, wherein the desired warning distance is a function of a width, a length and a radius of curvature of the vehicle, wherein the radius of curvature is derived from the current steering angle.

23. The method of claim 21, wherein the sensing system includes a radar sensor mounted at a rear of the vehicle.

24. The method of claim 21, wherein the sensing system includes a radar sensor and two ultrasonic sensors mounted at a rear of the vehicle.

25. The method of claim 21, wherein the maximum range of the sensing system is limited to about twenty feet.

26. The method of claim 21, wherein the current steering angle is provided by a steering angle sensor.

27. The method according to claim 21, wherein the current steering angle is provided by a yaw rate sensor.

28. An object sensing system that provides for limiting the range of the sensing system such that certain objects detected by the sensing system that are not in a vehicle path do not cause the sensing system to provide an alarm, comprising:
   a processor;
   a memory subsystem for storing information coupled to the processor;
   a steering angle sensor coupled to the processor;
   an object sensor coupled to the processor; and processor executable code for causing the processor to perform the steps of:

determining a desired warning distance based upon the current steering angle;

determining a current distance to a sensed object as derived from the object sensor; and providing an alarm only if the sensed object is within the desired warning distance.

29. The system of claim 28, wherein the desired warning distance is of function of a width, a length and a radius of curvature of the vehicle, wherein the radius of curvature is derived from the current steering angle.

30. The system of claim 28, wherein the object sensor includes a radar sensor mounted at a rear of the vehicle.

31. The system of claim 28, wherein the object sensor includes a radar sensor and two ultrasonic sensors mounted at a rear of the vehicle.

32. The system of claim 28, wherein the maximum range of the object sensor is limited to about twenty feet.

33. The system of claim 28, wherein the current steering angle is provided by a steering angle sensor.

34. The system of claim 28, wherein the current steering angle is provided by a yaw rate sensor.

35. An object sensing system that provides for limiting the range of the sensing system such that certain objects detected by the sensing system that are not in a vehicle path do not cause the sensing system to provide an alarm, comprising:

a processor;

a memory subsystem for storing information coupled to the processor;

a steering angle sensor coupled to the processor;

an object sensor coupled to the processor, wherein the object sensor includes a radar sensor that is mounted at a rear of a vehicle, and processor executable code for causing the processor to perform the steps of:

determining a desired warning distance based upon the current steering angle;

determining a current distance to a sensed object as derived from the object sensor; and providing an alarm only if the sensed object is within the desired warning distance.

36. The system of claim 35, wherein the desired warning distance is a function of a width, a length and a radius of curvature of the vehicle, wherein the radius of curvature is derived from the current steering angle.

37. The system of claim 35, wherein the object sensor further includes two ultrasonic sensors mounted at a rear of the vehicle.

38. The system of claim 35, wherein the current steering angle is provided by a steering angle sensor.

39. The system of claim 35, wherein the current steering angle is provided by a yaw rate sensor.

40. The system of claim 35, wherein the maximum range of the object sensor is limited to about twenty feet.

* * * * *

US006434486C1

(12) EX PARTE REEXAMINATION CERTIFICATE (10756th)
United States Patent
Studt et al.

(10) Number: US 6,434,486 C1
(45) Certificate Issued: Nov. 6, 2015

(54) TECHNIQUE FOR LIMITING THE RANGE OF AN OBJECT SENSING SYSTEM IN A VEHICLE

(75) Inventors: David Glen Studt, Noblesville, IN (US); Mark Ford Henderson, Kokomo, IN (US); Ronald Melvin Taylor, Greentown, IN (US)

(73) Assignee: SIGNAL IP, INC., Los Angeles, CA (US)

Reexamination Request:
No. 90/013,384, Oct. 27, 2014

Reexamination Certificate for:
Patent No.: 6,434,486
Issued: Aug. 13, 2002
Appl. No.: 09/648,972
Filed: Aug. 28, 2000

(51) Int. Cl.
*G01S 13/00* (2006.01)
*G01S 13/93* (2006.01)
*G01S 7/40* (2006.01)

(52) U.S. Cl.
CPC .............. *G01S 7/4004* (2013.01); *G01S 13/931* (2013.01); *G01S 2013/9353* (2013.01); *G01S 2013/9364* (2013.01); *G01S 2013/9375* (2013.01); *G01S 2013/9378* (2013.01)

(58) Field of Classification Search
None
See application file for complete search history.

(56) References Cited

To view the complete listing of prior art documents cited during the proceeding for Reexamination Control Number 90/013,384, please refer to the USPTO's public Patent Application Information Retrieval (PAIR) system under the Display References tab.

*Primary Examiner* — Joshua Campbell (57) ABSTRACT

An object sensing system is capable of masking certain detected objects such that the system does not provide an alarm. Initially, a projected path of the vehicle is determined by using a current steering angle of the vehicle. Next, a desired warning distance is determined based upon the current steering angle. Then, a current distance to a sensed object, as derived from an object sensor, is determined. Finally, an alarm is provided only if the sensed object is within the desired warning distance.

US 6,434,486 C1

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 21, 26 and 28 are cancelled.

New claims 41-77 are added and determined to be patentable.

Claims 1-20, 22-25, 27 and 29-40 were not reexamined.

*41. A method for limiting the range of an object sensing system such that certain objects detected by the sensing system that are not in a vehicle path do not cause the sensing system to provide an alarm, comprising the steps of:*
  *determining a projected path of a vehicle based upon a current steering angle of the vehicle;*
  *determining a desired warning distance based upon the current steering angle; determining a current distance to a sensed object; and*
  *always providing an alarm if and only if the sensed object is within the desired warning distance.*

*42. The method of claim 41, wherein the desired warning distance is a function of a width, a length and a radius of curvature of the vehicle, wherein the radius of curvature is derived from the current steering angle.*

*43. The method of claim 41, wherein the sensing system includes a radar sensor mounted at a rear of the vehicle.*

*44. The method of claim 41, wherein the sensing system includes a radar sensor and two ultrasonic sensors mounted at a rear of the vehicle.*

*45. The method of claim 41, wherein the maximum range of the sensing system is limited to about twenty feet.*

*46. The method of claim 41, wherein the current steering angle is provided by a steering angle sensor.*

*47. The method of claim 41, wherein the current steering angle is provided by a yaw rate sensor.*

*48. An object sensing system that provides for limiting the range of the sensing system such that certain objects detected by the sensing system that are not in a vehicle path do not cause the sensing system to provide an alarm, comprising:*
  *a processor;*
  *a memory subsystem for storing information coupled to the processor;*
  *a steering angle sensor coupled to the processor;*
  *an object sensor coupled to the processor; and*
  *processor executable code for causing the processor to perform the steps of:*
    *determining a projected path of a vehicle using a current steering angle of the vehicle as derived from the steering angle sensor;*
    *determining a desired warning distance based upon the current steering angle;*
    *determining a current distance to a sensed object as derived from the object sensor; and*
    *always providing an alarm if and only if the sensed object is within the desired warning distance.*

*49. The system of claim 48, wherein the desired warning distance is of function of a width, a length and a radius of curvature of the vehicle, wherein the radius of curvature is derived from the current steering angle.*

*50. The system of claim 48, wherein the object sensor includes a radar sensor mounted at a rear of the vehicle.*

*51. The system of claim 48, wherein the object sensor includes a radar sensor and two ultrasonic sensors mounted at a rear of the vehicle.*

*52. The system of claim 48, wherein the maximum range of the object sensor is limited to about twenty feet.*

*53. The system of claim 48, wherein the current steering angle is provided by a steering angle sensor.*

*54. The system of claim 48, wherein the current steering angle is provided by a yaw rate sensor.*

*55. An object sensing system that provides for limiting the range of the sensing system such that certain objects detected by the sensing system that are not in a vehicle path do not cause the sensing system to provide an alarm, comprising:*
  *a processor;*
  *a memory subsystem for storing information coupled to the processor;*
  *a steering angle sensor coupled to the processor;*
  *an object sensor coupled to the processor, wherein the object sensor includes a radar sensor that is mounted at a rear of a vehicle; and*
  *processor executable code for causing the processor to perform the steps of:*
    *determining a projected path of the vehicle using a current steering angle of the vehicle as derived from the steering angle sensor;*
    *determining a desired warning distance based upon the current steering angle;*
    *determining a current distance to a sensed object as derived from the object sensor; and*
    *always providing an alarm if and only if the sensed object is within the desired warning distance.*

*56. The system of claim 55, wherein the desired warning distance is a function of a width, a length and a radius of curvature of the vehicle, wherein the radius of curvature is derived from the current steering angle.*

*57. The system of claim 55, wherein the object sensor further includes two ultrasonic sensors mounted at a rear of the vehicle.*

*58. The system of claim 55, wherein the current steering angle is provided by a steering angle sensor.*

*59. The system of claim 55, wherein the current steering angle is provided by a yaw rate sensor.*

*60. The system of claim 55, wherein the maximum range of the object sensor is limited to about twenty feet.*

*61. A method for limiting the range of a object sensing system such that certain objects detected by the sensing system that are not in a vehicle path do not cause the sensing system to provide an alarm, comprising the steps of:*
  *determining a desired warning distance based upon a current steering angle;*
  *determining a current distance to a sensed object; and*
  *always providing an alarm if and only if the sensed object is within the desired warning distance,*
  *wherein the desired warning distance is a function of a width, a length and a radius of curvature of the vehicle, wherein the radius of curvature is derived from the current steering angle.*

*62. A method for limiting the range of a object sensing system such that certain objects detected by the sensing system that are not in a vehicle path do not cause the sensing system to provide an alarm, comprising the steps of:* determining a desired warning distance based upon a current steering angle; determining a current distance to a sensed object; and always providing an alarm if and only if the sensed object is within the desired warning distance,  wherein the sensing system includes a radar sensor mounted at a rear of the vehicle.

63. A method for limiting the range of a object sensing system such that certain objects detected by the sensing system that are not in a vehicle path do not cause the sensing system to provide an alarm, comprising the steps of:

determining a desired warning distance based upon a current steering angle;

determining a current distance to a sensed object; and always providing an alarm if and only if the sensed object is within the desired warning distance,  wherein the sensing system includes a radar sensor and two ultrasonic sensors mounted at a rear of the vehicle.

64. A method for limiting the range of a object sensing system such that certain objects detected by the sensing system that are not in a vehicle path do not cause the sensing system to provide an alarm, comprising the steps of:

determining a desired warning distance based upon a current steering angle;

determining a current distance to a sensed object; and always providing an alarm if and only if the sensed object is within the desired warning distance,  wherein the maximum range of the sensing system is limited to about twenty feet.

65. A method for limiting the range of a object sensing system such that certain objects detected by the sensing system that are not in a vehicle path do not cause the sensing system to provide an alarm, comprising the steps of:

determining a desired warning distance based upon a current steering angle;

determining a current distance to a sensed object; and always providing an alarm if and only if the sensed object is within the desired warning distance,  wherein the current steering angle is provided by a yaw rate sensor.

66. An object sensing system that provides for limiting the range of the sensing system such that certain objects detected by the sensing system that are not in a vehicle path do not cause the sensing system to provide an alarm, comprising:

a processor;

a memory subsystem for storing information coupled to the processor;

a steering angle sensor coupled to the processor;

an object sensor coupled to the processor; and processor executable code for causing the processor to perform the steps of:

determining a desired warning distance based upon a current steering angle;

determining a current distance to a sensed object as derived from the object sensor; and always providing an alarm if and only if the sensed object is within the desired warning distance,  wherein the desired warning distance is of function of a width, a length and a radius of curvature of the vehicle, wherein the radius of curvature is derived from the current steering angle.

67. An object sensing system that provides for limiting the range of the sensing system such that certain objects detected by the sensing system that are not in a vehicle path do not cause the sensing system to provide an alarm, comprising:

a processor;

a memory subsystem for storing information coupled to the processor;

a steering angle sensor coupled to the processor;

an object sensor coupled to the processor; and processor executable code for causing the processor to perform the steps of:

determining a desired warning distance based upon a current steering angle;

determining a current distance to a sensed object as derived from the object sensor; and always providing an alarm if and only if the sensed object is within the desired warning distance,  wherein the object sensor includes a radar sensor mounted at a rear of the vehicle.

68. An object sensing system that provides for limiting the range of the sensing system such that certain objects detected by the sensing system that are not in a vehicle path do not cause the sensing system to provide an alarm, comprising:

a processor;

a memory subsystem for storing information coupled to the processor;

a steering angle sensor coupled to the processor;

an object sensor coupled to the processor; and processor executable code for causing the processor to perform the steps of:

determining a desired warning distance based upon a current steering angle;

determining a current distance to a sensed object as derived from the object sensor; and always providing an alarm if and only if the sensed object is within the desired warning distance,  wherein the object sensor includes a radar sensor and two ultrasonic sensors mounted at a rear of the vehicle.

69. An object sensing system that provides for limiting the range of the sensing system such that certain objects detected by the sensing system that are not in a vehicle path do not cause the sensing system to provide an alarm, comprising:

a processor;

a memory subsystem for storing information coupled to the processor;

a steering angle sensor coupled to the processor;

an object sensor coupled to the processor; and processor executable code for causing the processor to perform the steps of:

determining a desired warning distance based upon a current steering angle;

determining a current distance to a sensed object as derived from the object sensor; and always providing an alarm if and only if the sensed object is within the desired warning distance,  wherein the maximum range of the object sensor is limited to about twenty feet.

70. An object sensing system that provides for limiting the range of the sensing system such that certain objects detected by the sensing system that are not in a vehicle path do not cause the sensing system to provide an alarm, comprising:

a processor;

a memory subsystem for storing information coupled to the processor;

a steering angle sensor coupled to the processor;

an object sensor coupled to the processor; and processor executable code for causing the processor to perform the steps of:
    determining a desired warning distance based upon a current steering angle;
    determining a current distance to a sensed object as derived from the object sensor; and
always providing an alarm if and only if the sensed object is within the desired warning distance,
    wherein the current steering angle is provided by a steering angle sensor.

71. An object sensing system that provides for limiting the range of the sensing system such that certain objects detected by the sensing system that are not in a vehicle path do not cause the sensing system to provide an alarm, comprising:
    a processor;
    a memory subsystem for storing information coupled to the processor;
    a steering angle sensor coupled to the processor;
    an object sensor coupled to the processor; and
    processor executable code for causing the processor to perform the steps of:
        determining a desired warning distance based upon a current steering angle;
        determining a current distance to a sensed object as derived from the object sensor; and
    always providing an alarm if and only if the sensed object is within the desired warning distance,
        wherein the current steering angle is provided by a yaw rate sensor.

72. An object sensing system that provides for limiting the range of the sensing system such that certain objects detected by the sensing system that are not in a vehicle path do not cause the sensing system to provide an alarm, comprising:
    a processor;
    a memory subsystem for storing information coupled to the processor;
    a steering angle sensor coupled to the processor;
    an object sensor coupled to the processor, wherein the object sensor includes a radar sensor that is mounted at a rear of a vehicle, and processor executable code for causing the processor to perform the steps of:
        determining a desired warning distance based upon the current steering angle;
        determining a current distance to a sensed object as derived from the object sensor; and
        always providing an alarm if and only if the sensed object is within the desired warning distance.

73. The system of claim 72, wherein the desired warning distance is a function of a width, a length and a radius of curvature of the vehicle, wherein the radius of curvature is derived from the current steering angle.

74. The system of claim 72, wherein the object sensor further includes two ultrasonic sensors mounted at a rear of the vehicle.

75. The system of claim 72, wherein the current steering angle is provided by a steering angle sensor.

76. The system of claim 72, wherein the current steering angle is provided by a yaw rate sensor.

77. The system of claim 72, wherein the maximum range of the object sensor is limited to about twenty feet.

* * * * *